A. JOHNSON.
APPARATUS FOR TRUING CAN BODIES AND POSITIONING ENDS THEREUPON.
APPLICATION FILED MAR. 30, 1917.
1,393,134.
Patented Oct. 11, 1921.
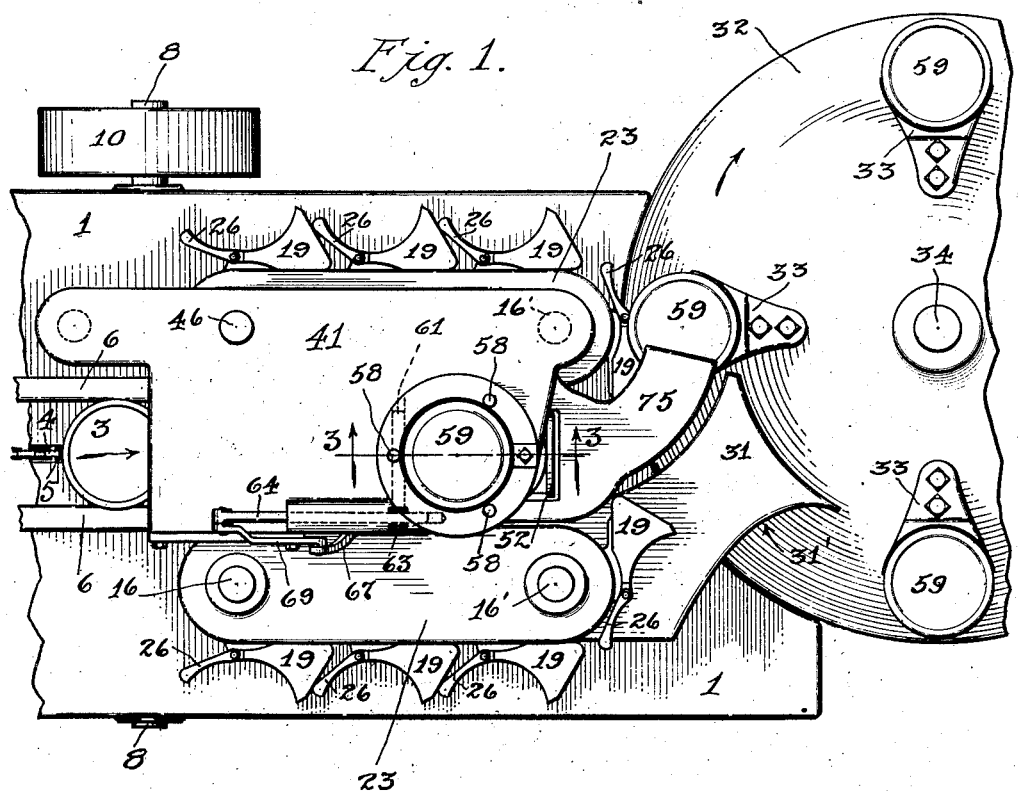
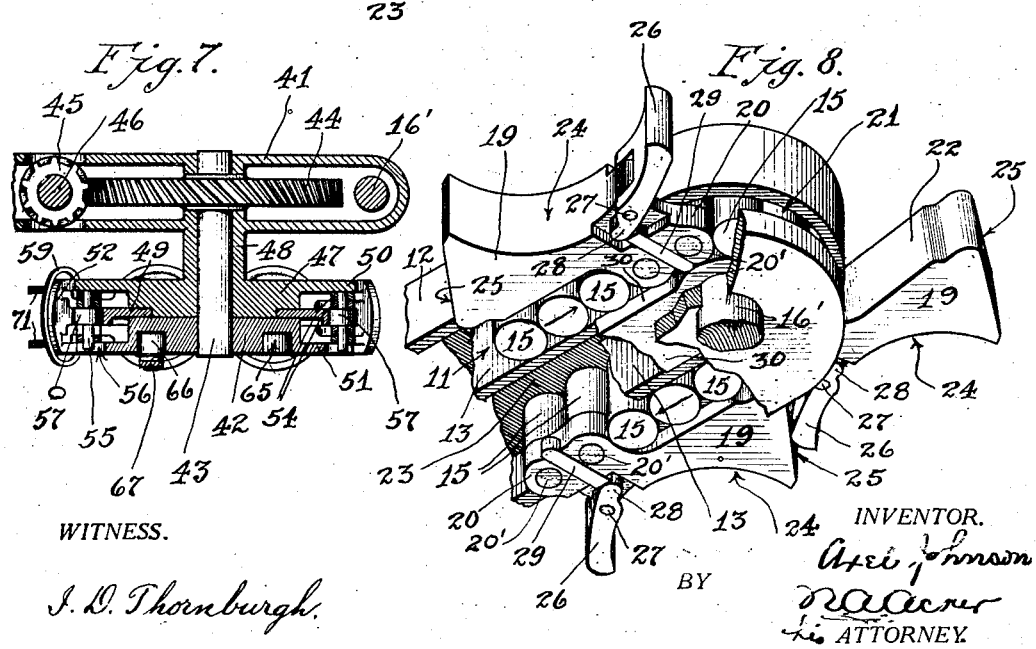
WITNESS.
J. D. Thornburgh.
INVENTOR.
Axel Johnson
BY
ATTORNEY.

A. JOHNSON.
APPARATUS FOR TRUING CAN BODIES AND POSITIONING ENDS THEREUPON.
APPLICATION FILED MAR. 30, 1917.
1,393,134.
Patented Oct. 11, 1921.
3 SHEETS—SHEET 3.
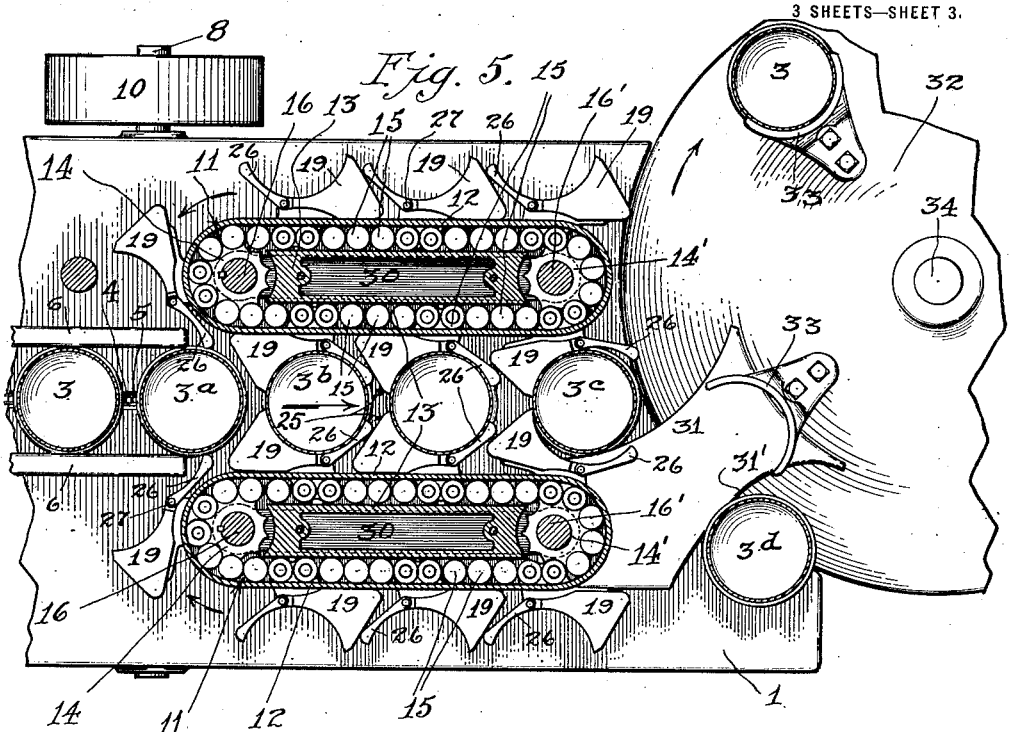
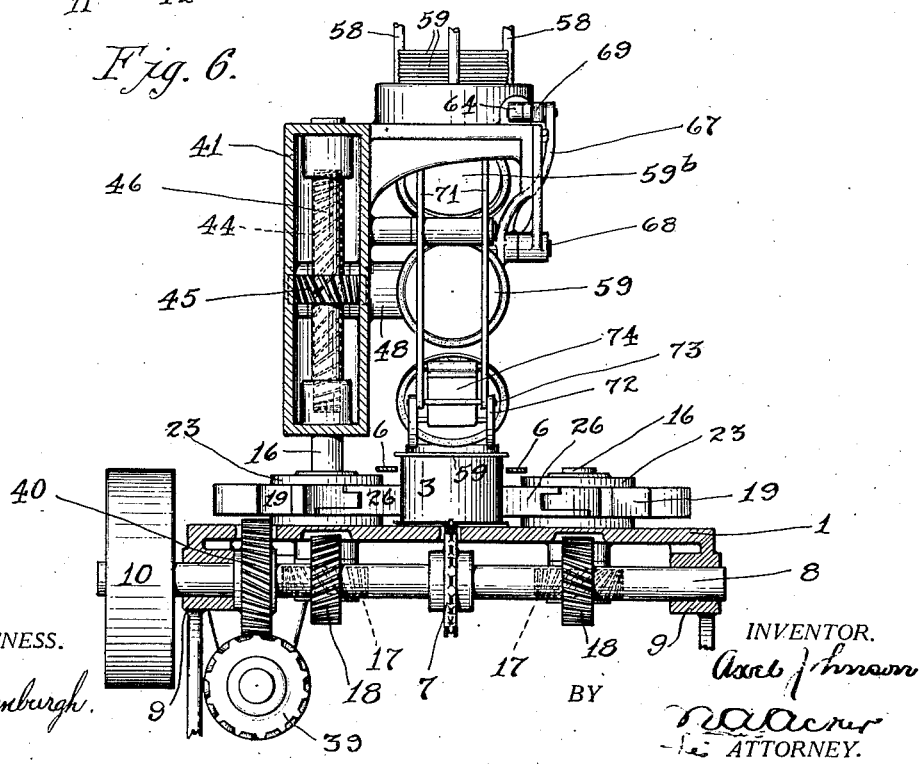
WITNESS.
INVENTOR.
BY
ATTORNEY.

UNITED STATES PATENT OFFICE.

AXEL JOHNSON, OF OAKLAND, CALIFORNIA, ASSIGNOR TO AMERICAN CAN COMPANY, OF SAN FRANCISCO, CALIFORNIA, A CORPORATION OF NEW JERSEY.

APPARATUS FOR TRUING CAN-BODIES AND POSITIONING ENDS THEREUPON.

1,393,134. Specification of Letters Patent. Patented Oct. 11, 1921.

Application filed March 30, 1917. Serial No. 158,746.

*To all whom it may concern:*

Be it known that I, AXEL JOHNSON, a citizen of the United States, residing at Oakland, in the county of Alameda and State of California, have invented certain new and useful Improvements in Apparatus for Truing Can-Bodies and Positioning Ends Thereupon, of which the following is a specification.

The present invention relates to an apparatus for loosely positioning ends upon can bodies preparatory to any subsequent operation which may be performed thereupon, as for example, cooking or seaming.

In machines for the above purpose, it is necessary that some means be provided for truing the can bodies prior to the placing thereupon of the ends, for the reason that the bodies as received by the machine are frequently slightly distorted and thrown out of shape by previous handling, and, in order to accurately position an end upon a can body, and to insure that the flanges of the end and the body will have the proper relative positions, the body must be in perfect form. The present invention therefore includes means for truing the can bodies as the same are advanced to the position at which the ends are applied thereto.

The principal object of the invention is to provide a machine for the described purpose whose parts have continuous movement, and in which the ends are successively placed upon the can bodies as the latter continuously advance from the receiving station to the discharging station. The advantages of continuously moving parts, in regard to saving of time and wear and tear on the mechanism, are too well known in the art to require further explanation.

In order to comprehend the invention reference should be had to the accompanying sheets of drawings, wherein:—

Figure 1 is a plan view of the machine.

Figure 2:
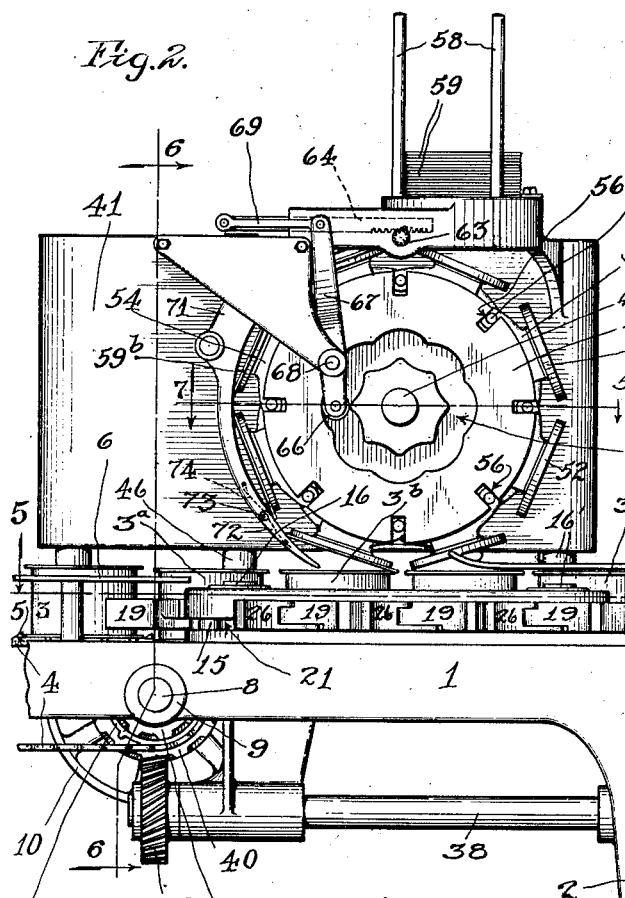
Fig. 2 is a front elevation of the operative parts of the machine.
Figure 2A:
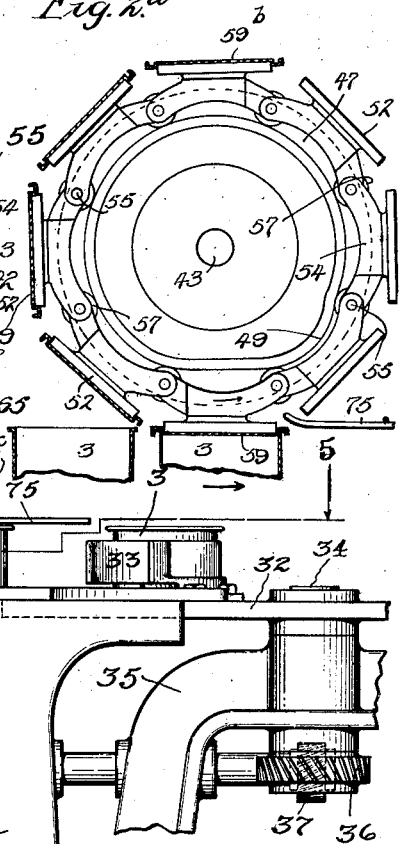

Fig. 2ª is a similar view with the cans and can ends shown in section and with the turret removed to expose the stationary cam.

Figure 3:
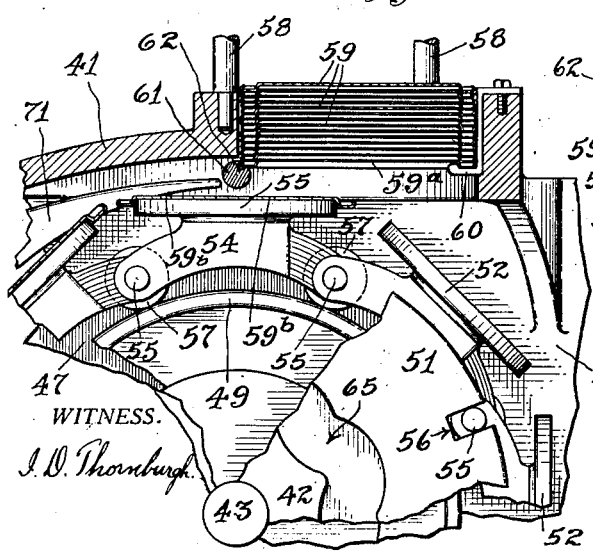

Fig. 3 is a partly broken detailed sectional elevation taken on the line 3—3 of Fig. 1 and viewed in the direction of the arrows.

Figure 4:
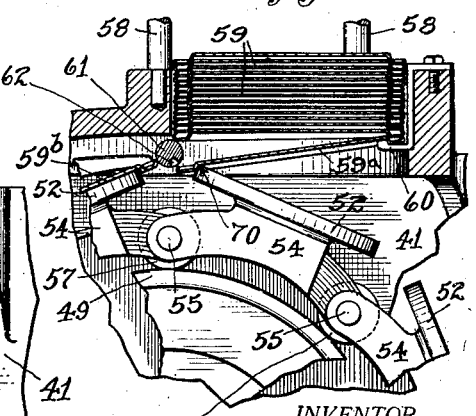

Fig. 4 is a view taken similarly to Fig. 3 showing the parts in a slightly further advanced position.

Fig. 5 is a sectional plan view taken on the line 5—5 of Fig. 2 and viewed in the direction of the arrows.

Fig. 6 is a transverse sectional elevation taken on the line 6—6 of Fig. 2 and viewed in the direction of the arrows.

Fig. 7 is a detailed sectional plan taken on the line 7—7 of Fig. 2 and viewed in the direction of the arrows.

Fig. 8 is a partly broken perspective detail of a portion of the can body truing mechanism.

In the drawings, the reference numeral 1 designates a bed plate or table upon which the operative parts of the machine are mounted, said table being supported by suitably constructed legs, one of which is shown at 2 in Fig. 2 of the drawings.

Open ended can bodies are brought onto the table 1 at the left hand end thereof as viewed in Figs. 1, 2 and 5 of the drawings, by means of a conveyer chain 4 having spaced flights 5 for engaging said cans. Suitable guide rails 6 are provided for guiding the can bodies 3 in proper relation to the conveyer chain 4, it being understood that said can bodies are placed within the sphere of action of said conveyer chain by any means not shown in the drawings. The conveyer chain 4 runs over a sprocket 7, Figs. 2 and 6 of the drawings, mounted upon a drive-shaft 8 disposed transversely beneath the table 1 and carried in suitable journals 9. Said shaft 8 is provided with a pulley 10, Figs. 1, 2, 5 and 6, of the drawings, for receiving power from an outside source, not illustrated, and constitutes the main drive-shaft of the machine.

Mounted upon the table 1 beyond the end of the conveyer chain 4 are two substantially oval run-ways 11, Fig. 5 of the drawings, said run-ways being parallel and spaced apart by a distance slightly greater than the diameter of the can bodies 3. Each of the run-ways 11 comprises an outer guide-wall 12 and an inner guide-wall 13, the two forming a continuous oval track with straight sides. At the ends of the inner guide-wall 13 of each run-way 11 are sprockets 14 and 14', the former a drive sprocket and the latter an idler, and each having a series of spaced teeth in its periphery. A continuous series of cylindrical blocks 15, standing on end, lie within each of the run-ways 11 and completely fills the same, said blocks forming an endless chain adapted for the transmission of compression strains only, that is, said blocks, which may be likened to the links of a chain, are not inter-connected, but lie within the groove or run-way 11 in contiguous relation and are advanced through said groove by being pushed by the end driving sprocket 14, the teeth of which are adapted to engage said blocks. It is understood of course, that the groove 11 is of such a width as to carry but one block at a time, to prevent the jamming of the blocks therein. The groove or runway 11 provides rigid inner walls which hold the hereinafter described can-forming devices up to their work and also furnish outer walls which prevent the forming devices from moving toward the cans so as to deform or further deform the same. The blocks 15, being cylindrical in form, offer comparatively little resistance in passing through their grooves, and if properly lubricated, travel therein with very little wear.

The sprockets 14 and 14', the former driving the endless series of blocks 15, are mounted upon vertical shafts 16 and 16' respectively, Figs. 1 and 5 of the drawings, the former of which extend through the table 1 and carry, below said table, spiral gears 17, Fig. 6, adapted to mesh with similar gears 18 mounted upon the drive-shaft 8.

Attached to certain of the cylindrical blocks 15 are can truing clamping members 19, Figs. 1, 5 and 8 of the drawings. Said clamping members are each formed within an inwardly projecting ear 20, adapted to extend through a continuous horizontal slot 21 formed in the outer wall 12 of the run-way 11, and adapted to be pivotally carried by two adjacent cylindrical blocks 15, as shown at 20' in Fig. 8. Said clamping member 19, which, as shown, lies outside the run-way 11, has a straight inner face 22 adapted to bear against the outside of the outer wall 12 of said run-way, and is formed upon its opposite face with a segmental circular can engaging portion 24, and with an inclined end face 25. A complementary jaw member 26 is pivotally connected, by means of a vertically disposed pin 27, with said clamping jaw 19 in the region of the inwardly extending ear 20 thereof, and said complementary jaw 26 has an arm 28 extending upon the opposite side of said pivot pin 27 and positioned to be engaged by a laterally sliding tongue 29 carried within a suitably formed guide-way in the ear 20 of the jaw member 19. The inner end of said sliding tongue 29 is adapted to bear against and follow a cam surface 30 formed at the lower portion of the inner guide-wall 13 of the run-way 11. The clamping members 19 are regularly spaced in the series of traveling blocks 15, there being three idler blocks between each adjacent pair of clamp carrying blocks in the form shown in the drawings. The run-ways 11 are covered, as shown at 23 in Fig. 1 of the drawings, to inclose the interior mechanism.

The operation of the mechanism above described will be readily understood by reference to Figs. 5 and 8 of the drawings. The series of traveling blocks are moved within their respective guide-ways 11 in the direction of the arrows. As each of the clamping members 19 reaches the left-hand end of its run-way 11, the sliding tongue 29 carried thereby is forced outwardly by the cam surface 30, as shown in Fig. 8, thus causing the complementary jaw member 26 to open or swing inwardly toward the outer wall of the run-way, and by so doing, they pass beside and in front of the advancing can body 3ª Fig. 5. When the clamping jaws 19 have traveled around onto the straight inner portions of their tracks 11, the circular outer portions 24 of said clamping members engage the rear half of the can body as shown at 3ᵇ, in Fig. 5, and at the same time, the complementary jaw members 26 ride against the inclined rear faces 25 of the preceding jaw members 19, and are thereby closed upon the forward half of said can body 3ᵇ, thus substantially encircling said can body and clamping the same securely in true cylindrical form.

The can body 3ᵇ is carried forward by the advancing jaws 19 and 26 until the right-hand ends of the run-ways 11 is reached. In this position, 3ᶜ of Fig. 5, the complementary jaw members 26 are caused to open by their respective sliding tongues, and the can body 3ᶜ, guided by a curved guide member 31, is pushed by the jaws 19 off the table 1 and onto any suitable means for conveying said can body from the machine. In the drawings, I have shown said conveying means as comprising a turret 32 positioned flush with the table 1, adapted for rotation in the direction of the arrow, and provided with can receiving pockets 33. It is understood that said turret 32 may form a part of any machine for performing subsequent operations upon the cans, its function in connection with the present invention being merely that of a discharge conveyer. The turret 32 is shown as mounted upon a vertical shaft 34 suitably carried within a supporting frame 35, Fig. 2 of the drawings, and carrying a spiral gear 36 upon its lower end, said gear being adapted to mesh with a similar gear 37 mounted upon the end of a longitudinally disposed horizontal shaft 38. Said shaft is suitably journaled in the frame of the machine and carries at its other end a spiral gear 39 adapted to mesh with a simipushed by the advancing jaws 19 onto the discharge turret 32 and into the can receiving pockets 33 thereof. Any subsequent operation may then be performed upon the can and the same is finally removed from said discharge turret 32 by a grooved guide member 31' as shown at 3ᵈ in Fig. 5 of the drawings.

The invention has hereinbefore been described and is herewith illustrated in its preferred form, but I do not wish to be understood as limiting myself to said preferred form, for the reason that many changes may be made in the form, and construction of the device without departing from the spirit of the invention. It is therefore my wish to be understood as claiming the invention as broadly as the state of the art will permit.

Having thus described my invention, what I claim as new and desire to protect by Letters Patent is:—

1. In a machine for the described purpose, a holder adapted to contain a stack of inverted can ends, a device co-acting with said holder for cutting out the lowermost end of the stack of ends contained therein, continuously moving conveying means for removing the cut out end, reversing the position thereof and applying the same to the open end of a positioned can body, and means for truing and clamping said can body in position to receive the can end.

2. A machine for the described purpose comprising a holder adapted to contain a stack of inverted can ends, means for cutting out the lowermost end of said stack, rotary traveling means operating in a vertical plane for removing the cut out end from said holder, reversing the position thereof and applying the same to the open end of a positioned can body, and means for positioning said can body to receive said end and for truing and clamping the same in said position.

3. A machine for the described purpose comprising a holder adapted to contain a stack of inverted can ends, a device co-acting with said holder for cutting out the lowermost can end of said stack, receiving means for removing the cut out end and applying the same to a positioned can body, means for imparting a curvilinear path of travel in a vertical plane to said can end receiving means, and means for imparting a relatively straight line of travel thereto for the deposit of the can end, and devices for positioning the can body to receive said can end and for truing and clamping the same in said position.

4. A machine for the described purpose, comprising continuously moving devices for receiving and advancing can bodies through the machine and for clamping and truing the same during the advance thereof, a vertically disposed rotary turret, and a plurality of circumferentially disposed can end chucks connected with said turret and movable at times toward and from the center thereof for receiving, conveying and positioning can ends successively upon said can bodies.

5. A machine for the described purpose having in combination, coöperating devices for receiving, advancing and truing can bodies, a can end stack holder, a vertically disposed rotary turret, an endless chain arranged around said turret and having a propelling engagement therewith, the chain elements being movable toward and from the axis of the turret, a guide relative to which the chain is propelled, can end chucks carried by the chain elements for taking can ends from said holder and applying them to the said can bodies successively, and mechanism for operating said turret and said can-advancing devices in timed relation.

6. A machine for the described purpose, comprising associated devices for receiving, advancing and truing a can body, a holder adapted to contain a stack of inverted can ends, and an invertible chuck for receiving the lowermost can end when delivered from said stack, and inverting and applying the same to said can body.

7. An apparatus for the described purpose, comprising means for receiving, advancing continuously and truing a succession of can bodies, a holder adapted to contain a stack of inverted can ends, and means for successively removing said ends from said holder, inverting the same and applying the inverted ends to said advancing can bodies.

8. A machine for the described purpose comprising continuously moving means for receiving, clamping and truing a can body and for advancing the same in a continuous straight path, a holder adapted to contain a stack of can ends face to face in horizontal position, and a series of can end holding chucks coöperating directly with the holder and directly with the cans in said truing means, for removing the lowermost end from said stack and positioning the same upon the advancing can body.

9. A machine for the described purpose comprising means for receiving and advancing a succession of can bodies, devices associated with and carried by said receiving and advancing means for clamping the can bodies to true the same to perfect form, and rotary traveling means turning in a vertical plane and comprising a chain, chucks thereon and means for varying the distance of the chucks from the center of rotation, for successively placing can ends upon said can bodies while so clamped.

10. A machine for the described purpose comprising a pair of opposing endless and flexible conveyers for receiving and continular gear 40 mounted upon the drive shaft 8, as shown in Figs. 2 and 6.

Positioned above the table 1 is a superstructure 41, Figs. 1, 2, 6 and 7 of the drawings, which carries the mechanism for positioning can ends upon the advancing can bodies. A vertically disposed turret 42, Figs. 2 and 7 of the drawings, is carried by a horizontal shaft 43, journaled in the superstructure 41 and driven by means of a spiral gear 44, Figs. 5 and 7, the latter being adapted to mesh with a similar gear 45, mounted upon a vertical shaft 46, said shaft being an extension of one of the sprocket shafts 16. The turret 42 is backed by a stationary plate 47, Fig. 7, supported by a hub 48 extending laterally and forwardly from the superstructure 41. An annular stationary cam 49 is carried upon said stationary plate 47 and is positioned midway between a peripheral flange 50 of said plate and a peripheral flange 51 carried by the turret 42 and spaced from said peripheral flange 50. The turret 42 carries a series of can end chucks 52, Figs. 2, 3 and 4 of the drawings, each of said chucks being secured to a foot 54, having arms extending in a direction substantially circumferential with respect to the turret. The ends of said arms are pivotally interconnected by pivots 55, as shown, in Figs. 2, 3 and 7 of the drawings, which project through radially disposed slots 56 formed in the peripheral region of the turret 42. The arms of said chuck holding feet 54 are bifurcated to receive cam following rollers 57, rotatably mounted upon the pivot pins 55, said rollers being adapted to follow the stationary cam 49. Thus the interconnected series of chucks 52 are caused to travel around the stationary cam track 49 by means of the engagement of the pivot pins 55 with the radial slots 56 formed in the rotating turret 42.

In the upper portion of the superstructure 41 is mounted a can end holder or magazine comprising spaced vertically disposed rods 58, Figs. 1 3 and 4 of the drawings, within which is contained a stack of superposed and inverted can ends 59. The lowermost can end 59$^a$, as shown in Fig. 3 of the drawings, rests at one side upon a lug or bracket 60 projecting into the bottom of the holder and at the other side upon a transverse rod 61 mounted for oscillation in the lower portion of said holder and provided with a groove or notch 62. Said rod 61 extends outside the holder and carries upon its outer end a pinion 63, Fig. 2, adapted to mesh with a horizontally disposed sliding rack bar 64. Said rack-bar is reciprocated by means of a cam groove 65 formed in the outer face of the turret 42, within which rides a roller 66 carried by the lower end of a lever 67, fulcrumed at 68, and connected at its upper end with the reciprocating rack bar 64 by means of connecting rod 69. When the oscillating shaft 61 is actuated to move the notch 62 therein downwardly from the position shown in Fig. 3 to that shown in Fig. 4, said groove engages the outer edge of the lowermost can end 59$^a$ and forces the same downwardly into the position shown in Fig. 4, where the shoulder 70 of said can end is engaged by the advancing chuck 52. The can end 59$^a$ is thereby withdrawn from the bottom of the holder 58, and lies upon the chuck 52 as shown at 59$^b$ in Fig. 3. The can end is then carried upon said chuck and inverted, curved guide-members 71, Figs. 2, 3, 4 and 6 being provided to hold said can end upon said chuck.

When the chuck carrying the can end 59$^b$ reaches the lowermost point in its travel, said can end is positioned upon one of the advancing can bodies therebeneath. In order to insure the correct positioning of the can end upon the can body, the chuck 52 is caused to depart from its circular path of travel by the stationary cam member 49, so that the can end is deposited, in a horizontal position, upon the alined can body beneath, and the chuck is then elevated off said can body, also in a substantially horizontal position. The lower ends 72 of the guides 71 are hinged at 73, Fig. 2 of the drawings, and are firmly pressed upwardly by a spring 74. The can end, when positioned upon the can body, is retained thereupon by a plate 75, Figs. 1 and 2 of the drawings, which closely over-lies said end and extends to a position over the discharge turret 32.

The operation of the machine may be briefly summarized as follows:—

A series of open ended can bodies having been placed, by outside means, not shown in the drawings, upon the conveyer chain 4, the same are advanced thereby into the sphere of action of the machine and are successively engaged, clamped and trued to cylindrical form by the continuously advancing clamping jaws 19 and 26. At the same time, can ends 59 are successively removed from the magazine 58, and are carried by the chucks 52 of the rotating vertical turret 42 downwardly, and are successively positioned upon the can bodies traveling therebeneath. As each can end chuck 52 approaches the lower portion of the magazine 58, the lowermost can end 59$^a$ within said magazine is tilted by the oscillating shaft 61 and is engaged by said advancing chuck and removed thereby. The guide-rails 71 thereafter hold said can end in engagement with said chuck until said end is positioned upon the can body, whereupon the can end drops from beneath the chuck, and, resting upon the can body, is carried off therewith beneath the plate 75. The can bodies, having been restored to their true cylindrical form, are released by the clamping jaws 26 and are and applying the same to a positioned can body.

21. In an apparatus for the described purpose, the combination with mechanism for receiving, truing and positioning can bodies for the reception of can ends, of means associated therewith for receiving inverted can ends, reversing the position thereof, and applying the same successively to said positioned can bodies.

22. In an apparatus for the described purpose, the combination with mechanism for receiving, clamping, truing and positioning a can body for the reception of a can end, of a holder adapted to contain a stack of inverted can ends, a rotary member interposed between the said stack and the mechanism for positioning the can bodies, and a plurality of circumferentially disposed can end chucks pivotally connected to said rotary member, said chucks being adapted to successively remove from the can end holder the lowermost of the inverted can ends, reversing the position thereof, and applying the same to the positioned can body.

23. In an apparatus for the described purpose, the combination with means for receiving, clamping, truing and positioning a can body for the reception of a can end, of a holder adapted to contain a stack of inverted can ends, and a movable member having an open seat for the reception of an inverted can, said member adapted to remove the lowermost end from the stack, reverse the position thereof and apply the same to the end of a positioned can body.

24. In an apparatus for the described purpose, the combination with longitudinally movable means for receiving, clamping, truing and positioning can bodies for the reception of can ends, of a movable can end receiving member adapted to receive an inverted can end, reverse the position thereof, and apply the same to the end of a positioned can body, and means for delivering inverted can ends to the said movable can end receiving member.

25. The combination of a can body carrier, a can end carrier for operating on shouldered can ends and rotatable on a horizontal axis and arranged above said can body carrier, can end feeding chucks on said can end carrier, said chucks having an engagement within the shoulder of the can end, actuating means for causing said chucks to register with the open ends of can bodies moving with their carrier, and means for forcing said chucks away from their axis of rotation for bringing the can ends into engagement with said bodies.

26. The combination of a can body carrier, a can end carrier rotatable on a horizontal axis and arranged above said can body carrier, can end feeding chucks on said can end carrier and movable at times toward and from the axis of the carrier, actuating means for causing said chucks to register with the open ends of can bodies on their carrier, and means for forcing said chucks away from their path of rotation to press can ends into engagement with said bodies, said can body carrier having means for truing said can bodies.

27. The combination of a can body carrier, a can end carrier rotatable on a horizontal axis and arranged above said can body carrier, can end feeding chucks on said can end carrier and movable at times toward and from the axis of the carrier, actuating means for causing said chucks to register with the open ends of can bodies on their carrier, and means for forcing said chucks away from their path of rotation to press can ends into engagement with said bodies, and means for actuating said carriers with continuous movement.

28. The combination of a can body carrier, a can end carrier rotatable on a horizontal axis and arranged above said can body carrier, can end feeding chucks on said can end carrier and movable at times toward and from the axis of the carrier, actuating means for causing said chucks to register with the open ends of can bodies on their carrier, and means for forcing said chucks away from their path of rotation to press can ends into engagement with said bodies, said can body carrier having means for truing said can bodies, and means for actuating said carriers with continuous movement.

29. The combination of two endless opposed and coöperating can body moving and reforming devices, having straight paths of travel where they so coöperate, means for moving said devices continuously, means carried by each of said endless devices for engaging and reforming the can bodies, and combined with the same can end applying means at an applying station past which the can bodies are carried, and separate from and movable toward and from said moving and reforming devices and movable toward and from the ends of the can bodies in time with the conveying movement of said reforming devices to apply can ends to said bodies while they are reformed.

30. A pair of endless continuously moving can body reformers acting on opposite sides of a can body to convey and reform the same, and combined with the same can end applying means at an applying station past which the can body is carried, and separate from and movable toward and from said reformers, and movable toward and from the can bodies in time with the conveying movement of said reformers, to apply can ends to the can bodies while they are reformed.

31. The combination of two endless opposed and coöperating can body moving and reforming devices, having straight paths ously advancing a succession of can bodies, devices associated with and carried by said advancing conveyers for clamping said can bodies to true the same to perfect form, continuously rotating devices for successively placing can ends upon said advancing can bodies, and mechanism for operating said can body advancing means and said can end placing means in timed relation.

11. An apparatus for the described purpose comprising means for receiving, truing and advancing a succession of can bodies, a holder adapted to contain a stack of inverted can ends, a vertically disposed rotary turret, a series of can end chucks peripherally disposed upon said turret and carried in a substantially circular path thereby, said chucks being adapted to successively coöperate directly with said holder to remove the lowermost can end from said stack and position the same upon an advancing can body, and means for causing said chucks successively to deviate from their circular path to apply said can ends in a horizontal position to said can bodies.

12. A machine for the described purpose, comprising means for advancing continuously and truing a succession of can bodies, a holder adapted to contain a stack of inverted can ends, a series of interconnected can end chucks adapted to successively remove the lowermost end from said stack and to invert the same and apply the inverted can end to an advancing can body, and mechanism for imparting continuous movement in a substantially circular path to said can end chucks.

13. A machine for the described purpose comprising means for truing and advancing a can body, a holder adapted to contain a stack of inverted can ends, a vertically disposed rotatable turret positioned below said holder and above the advancing can body, and a can end chuck carried by said turret and adapted to remove the lowermost can end from said holder, to invert the same, and to place the same in a horizontal position upon said can body.

14. A machine for the described purpose comprising means for truing and advancing a succession of can bodies, a holder adapted to contain a stack of inverted can ends, a vertically disposed rotatable turret positioned below said holder and above said advancing can bodies, a vertically disposed stationary cam positioned adjacent to said turret, a series of interconnected can end chucks adapted to encircle said cam and to follow the surface thereof, and means for connecting said chucks to said turret whereby the rotation of the latter causes said chucks to travel around said cam to successively remove can ends from said holder, invert the same and position the same upon the advancing can bodies.

15. An apparatus for the described purpose comprising a pair of spaced oppositely disposed conveyers, co-acting jaw members carried by said conveyers for receiving and clamping and truing a can body and advancing the same between said conveyers, a holder adapted to contain a stack of inverted can ends, a vertically disposed rotatable turret positioned below said holder and above the advancing can body, and a can end chuck carried by said turret and adapted to remove a can end from said holder and position the same upon said advancing can body while it is compressed and trued by said jaw members.

16. An apparatus for the described purpose, comprising a pair of spaced continuous run-ways, a series of disconnected members lying within said run-ways and forming within each a continuous conveyer, means for engaging said conveyer members to cause the same to travel continuously through said run-ways, co-acting jaw members carried by said conveyer members for receiving, truing and advancing a can body between said two run-ways, a holder adapted to contain a stack of inverted can ends, a vertically disposed rotary turret positioned below said holder and above the advancing can body, and a can end chuck carried upon said turret and adapted to remove a can end from said holder, invert the same and apply the same to said can body while held by said co-acting clamping jaw members.

17. The combination with mechanism for receiving, clamping and truing a can body and positioning the same to have applied thereto a can end, of rotary means for receiving an inverted can end, reversing the position thereof and applying the same to the positioned can body.

18. The combination with means for receiving, clamping, truing and delivering a can body to position for receiving a can end, of mechanism associated therewith for receiving an inverted can end, reversing the position thereof and applying the same to the positioned can body.

19. The combination with continuously traveling mechanism for receiving, clamping, truing and placing a can body in position to receive a can end, of continuously traveling mechanism associated therewith for receiving an inverted can end, reversing the position thereof and applying the same to the positioned can body.

20. The combination with a continuously traveling mechanism for successively receiving, clamping, truing and positioning can bodies for the reception of can ends, of a holder adapted to contain a stack of inverted can ends, a rotary means associated with said holder for removing the lowermost of said ends, inverting the position thereof, of travel where they so coöperate, means carried by each of said endless devices for engaging and reforming such bodies, means for actuating said devices continuously, guides for said engaging and reforming means holding them against successively received can bodies, and combined with the same can end applying means at an applying station past which the can bodies are carried, and separate from and movable toward and from said moving and reforming devices and movable toward and from the ends of the can bodies in time with the conveying movement of said reforming devices, to apply can ends to the can bodies while they are reformed.

32. The combination of two endless opposed and coöperating can body moving and reforming devices, having straight paths of travel, where they so coöperate, and means carried by each of said endless devices for engaging and reforming such bodies, each of said engaging and reforming means on each of said endless devices comprising two jaws having movement relative to each other and to the can body.

33. In a can end feeding device for positioning can ends upon can bodies the combination of a stack holder, a series of chucks rotary in a vertical plane and arranged to take can ends directly from the bottom of said holder, links pivotally connecting said chucks, and a central guide for said chucks whose guiding surface varies in radial distance from the axis of rotation.

In testimony whereof I have signed my name to this specification in the presence of two subscribing witnesses.

AXEL JOHNSON.

Witnesses:
N. A. ACKER,
D. B. RICHARDS.